United States Patent Office 2,887,469
Patented May 19, 1959

2,887,469

MODIFIED POLYMERIC PRODUCTS AND METHODS OF MAKING THE SAME

Cornelius C. Unruh and Donald A. Smith, Rochester, N.Y., assignors to Eastman Kodak Company, Rochester, N.Y., a corporation of New Jersey No Drawing. Application November 2, 1953
Serial No. 389,892

9 Claims. (Cl. 260—77.5)

This invention relates to modified polymers and is particularly concerned with urethane derivatives of hydroxyl-containing polymers.

A large number of hydroxyl-containing polymers are known including partially esterified or etherified polyalkylene polymers such as polyvinyl alcohol, partially esterified or etherified cellulose or starch derivatives, starch, cellulose, hydroxy alkyl cellulose and the like. These materials find utility in a variety of applications, but in some cases it is desirable to modify their chemical or physical properties to make them more suitable for certain uses or to make derivatives which are usable for applications in which the unmodified polymers are unsuitable. Thus, for example, it is often desirable to increase the hydrophilic character of certain polymers or to convert hydrophilic polymers into hydrophilic polymers or even highly water soluble derivatives.

It is accordingly an object of this invention to provide new methods for modifying hydroxyl-containing polymers to produce new and useful polymeric derivatives.

It is a further object of this invention to convert cellulose, starch and polyalkylene compounds containing functional hydroxyl groups to new polymers having modified physical and chemical characteristics.

Another object of the invention is to replace at least a portion of the functional hydroxyl groups in hydroxy polymers with groups which increase the hydrophilic character of the polymers.

Another object of the invention is to provide halourethane derivatives of hydroxyl-containing polymers by a simple but effective method.

Another object of the invention is to prepare quaternary tertiary amine derivatives of halourethane-modified polymers.

Another object of the invention is to provide a method for concomitantly converting polymeric materials to halourethane polymeric derivatives and quaternizing such derivatives to form hydrophilic polymers.

Another object of the invention is to provide a new class of polymeric materials having particular utility as emulsion addenda, mordants in color processes, and carriers for photosensitive silver halide salts and the like in photographic materials.

Another object of the invention is to provide processes for forming new polymeric materials during the dyeing of textiles.

Other objects will be apparent from the description and claims which follow.

These and other objects we attained by means of this invention as described more fully hereinafter with particular reference to certain preferred embodiments thereof. We have found that the properties of polymeric materials containing functional hydroxyl groups can be readily modified by means of haloisocyanates to form halourethane derivatives of such polymeric materials, and that such halourethane derivatives can be further modified, either concomitantly or separately, by quaternization with tertiary amines.

The invention is applicable for modifying any of the well-known hydroxyl-containing polymers. Thus, for example, the polymeric materials containing a plurality of recurring alkylene groups, including the polyalkylidene polymers, whether in the form of the alcohol or partially esterified or etherified can be employed in practicing the invention. Hydrolyzed alkylene ester polymers and copolymers can also be used as well as carbohydrate polymers such as starch, cellulose, glycogen and the like. The partially esterified and etherified carbohydrate polymers are also eminently suited for modification in accordance with this invention. Typical hydroxy polymers suitable for use in practicing this invention include but are not limited to polyvinyl alcohol, partially hydrolyzed polyvinyl acetate and polyvinylidene acetate or copolymers thereof, polyvinyl butyral compositions containing polyvinyl alcohol, cellulose, starch, glycogen, incompletely etherified cellulose ethers such as cellulose methyl ether, cellulose ethyl ether and the like, incompletely esterified cellulose esters such as cellulose acetate, cellulose butyrate and the like having any degree of acylation less than complete acylation, and similar hydroxy polymers, including hydroxyethyl cellulose and hydrolyzed copolymers of vinyl acetate with other polymerizable monomers such as ethylene.

These and similar hydroxy polymers are modified in accordance with this invention by reacting such polymers with a haloisocyanate of the formula

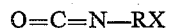

wherein R is an alkyl group whether substituted or unsubstituted, saturated or unsaturated and including the aralkyl groups, and X is a halogen atom which is preferably but not necessarily either a chlorine or bromine atom. The nature of the alkyl or aralkyl group does not adversely affect the course of the reaction and can be varied as desired. The compounds preferably employed for best results are the chloro- or bromo- alkyl or aralkyl isocyanates such as β-chloroethyl isocyanate, β-bromoethyl isocyanate, chloromethyl isocyanate, bromomethyl isocyanate, chlorovinyl isocyanate, chlorophenylethyl isocyanate and the like. These and similar haloisocyanates as defined herein react with some or all of the functional hydroxyl groups of the polymeric material to give a halourethane derivative characterized by substituent groups on the polymer of the formula

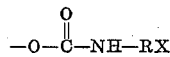

The formation of the halourethane derivatives embodying the invention can be effected with equimolar proportions of the reactants if desired or with an excess of either reactant up to 10 times the stoichiometric amount or more depending upon the degree of modification desired, the degree of hydroxylation of the polymer, the reaction conditions and similar well-known variable factors. The reaction is desirably effected in solvent media for facilitating the course of the reaction; although, if one of the reactants is a liquid, it can be employed in excess and serve as the reaction vehicle. The reaction is promoted by the use of elevated temperatures with temperatures of about 50° to 100° C. being preferably employed although higher or lower temperatures can be used, the practical upper limit of temperature depending upon the thermal stability of the reactants. The reaction usually requires at least an hour at steam bath temperatures and may extend for as long as from 5 to 20 hours or longer in some cases depending upon the nature of the reactants, the degree of modification desired and the reaction conditions employed. In many cases when a solvent is employed, it is desirable for optimum results to effect the reaction at reflux temperatures.

The halourethane derivatives can be used directly for many applications as for example as mordants in textile dyeing or the like wherein the derivative is further reacted directly on the textile fiber. In many cases, particularly where a more hydrophilic or even a water soluble polymeric material is desired, the halourethane derivative is modified further by quaternizing with a tertiary amine. In this case, the halourethane derivative is reacted with any of the well-known tertiary amines including the trialkyl amines such as trimethyl amine, triethyl amine and the like; dialkyl monoaryl amines such as N,N-diethyl aniline; aralkyl tertiary amines such as tri(phenylethyl) amine; heterocyclic tertiary amines such as pyridine, quinoline and the like, and similar tertiary amines including those containing more than one amino group whether tertiary or not.

The reaction between the halourethane and the tertiary amine can be effected either subsequent to the formation of the halourethane or concomitantly therewith by inclusion of the hydroxy polymer, haloisocyanate and tertiary amine in a single reaction mixture. The reactions embodying the invention including both the formation of the halourethane derivatives and the formation of the quaternary derivatives, whether separate or concomitant, can, of course, be effected either batch-wise or in a continuous process as desired and in accordance with known chemical practice. In many cases, both types of modified polymers can be precipitated out by use of suitable non-solvents although in some cases, particularly in a batch process, it may be desired to merely remove the reaction vehicle. Many of the tertiary amines, such as pyridine, form an excellent reaction vehicle when employed in excess and no other solvent need be employed. If desired, however, any well-known inert solvent can be employed as reaction media such as dioxane, acetone or similar solvent, and preferably a solvent in which the polymeric material being modified is either partially or completely soluble. The reactions, particularly the quaternization reaction, proceeds well in a non-solvent system, however, and it is desirable in some cases to employ a heterogeneous system.

The products prepared in accordance with this invention are useful as film bases, mordants, emulsion addenda and the like. The quaternized halogeno-urethane derivatives particularly are highly hydrophilic and can be used extensively as mordants in the color-forming layers of photographic films and papers, or as mordants in color-proofing processes as well as in the textile industries. The invention finds utility in dyeing textiles; and, particularly, a hydroxy polymer fiber such as a cellulose acetate fiber containing free hydroxyl groups can be treated directly with a haloisocyanate, and the resulting carbamate fiber can be directly reacted with a dye molecule containing a tertiary amino group during the dyeing process.

The invention is illustrated by the following examples of certain preferred embodiments thereof. It will be understood, however, that the examples are included merely for illustration and are not intended to limit the scope of the invention unless otherwise specifically indicated.

*Example 1*

To a solution of 10 g. of ethyl cellulose (ethoxyl content=45.5%) in 190 g. of dry dioxane was added 10 g. of β-chloroethyl isocyanate. The resulting clear solution was heated under reflux for 2.5 hours, diluted with about 50 cc. of dioxane, and then poured into an excess of cold water with stirring. The white, fibrous precipitate thus obtained was pressed out, dried at room temperature, redissolved in acetone and reprecipitated in water. The β-chloroethyl urethane derivative of ethyl cellulose obtained as a white, fibrous polymer weighed 11.5 g. and had a nitrogen content of 2.3% and a chlorine content of 5.2%.

*Example 2*

A 10 g. portion of cellulose acetate (acetyl content=38.6%) was dissolved in 190 g. of dry dioxane. To this solution was added 10.0 g. of β-chloroethyl isocyanate, and the resulting mixture was heated on the steam bath under reflux for 2.5 hours and then thinned with acetone. The reaction mixture was then poured into an excess of cold water with stirring and the white fibrous precipitate thereby obtained was pressed out and dried at room temperature. The β-chloroethyl urethane product was then redissolved in acetone and the resulting solution was poured in a thin stream into a large volume of methanol. The fibrous polymer was leached in methanol and dried at 40° C. to give 11.1 g. of product having N=1.5% and Cl=3.3%.

*Example 3*

A suspension of 21 g. of polyvinyl alcohol in 100 ml. of dry dioxane was mixed with 26.5 g. of β-chloroethyl isocyanate. The resulting mixture was heated on the steam bath and stirred for 5 hours, cooled, filtered, and the solid product washed successively with dioxane acetone, and methanol. The pale brown powdery product, after being dried at 40° C., weighed 33.5 g. and had N=5.2% and Cl=13.6%.

*Example 4*

A mixture of 11.0 g. of polyvinyl alcohol, 35.0 g. of β-chloroethyl isocyanate and 100 ml. of dry dioxane was heated on the steam bath and stirred for 4 hours. The product was precipitated by the addition of an acetone-ether mixture, filtered out and dried. The halourethane product weighed 20 g. and contained 6.7% nitrogen and 17.6% chlorine.

*Example 5*

Polyvinyl alcohol was modified to a lesser degree by heating a mixture of 22.0 g. of polyvinyl alcohol, 10.5 g. of β-chloroethyl isocyanate and 100 ml. of dry dioxane for 4.5 hours on a steam bath. The product was collected by filtration, and washed successively with dioxane and methanol to give 28.0 g. of powdery polymer which was soluble in hot dimethyl formamide and which had a nitrogen content of 2.8% and a chlorine content of 6.6%.

*Example 6*

The properties of the modified polymer vary from these of the preceding example when lesser amounts of the haloisocyanate are employed. Thus, a suspension of 22.0 g. of polyvinyl alcohol in 100 ml. of dry dioxane was mixed with 5.3 g. of β-chloroethyl isocyanate, and then heated and stirred on the steam bath for 18 hours. After washing with dioxane and then methanol, the product was dried at 40° to give 24.0 g. of modified polymer having N=1.3% and Cl=3.1%. The product swelled in hot water and was partially soluble in dilute ethanol and dioxane.

*Example 7*

Partially esterified polymeric esters are modified in similar fashion in accordance with this invention. A 26.0 g. portion of approximately 50 mol percent hydrolyzed polyvinyl acetate was allowed to stand in 200 ml. of dioxane for 15 hours. To the swollen polymer was added 23.0 g. of β-chloroethyl isocyanate and an additional 50 ml. of dioxane. The resulting mixture was then heated and stirred for 24 hours on the steam bath. After cooling, a small amount of undissolved material was removed by filtration, and the product was precipitated in water. This product was redissolved in acetone and again precipitated in water to give a very soft rubbery polymer which was soluble in dimethyl formamide and which analyzed for N=5.1% and Cl=12.6%.

*Example 8*

A 10 g. portion of hydroxyl-containing cellulose acetate polymer (16.7% acetyl) was dissolved in 100 ml. of hot freshly distilled dimethyl formamide and treated with 25 g. of β-chloroethyl isocyanate. The resulting solution was stirred and heated on the steam bath for 5.5 hours, cooled, and the modified chlorourethane polymer was obtained by precipitation in methanol. The product had N=5.6% and Cl=11.3%.

Example 9

A cellulose acetate polymer (38.6% acetyl) was modified with β-chloroethyl isocyanate in accordance with the method of Example 1. Three grams of the resulting β-chloroethyl carbamate of cellulose acetate was dissolved in 20 ml. of dry dioxane, and to the resulting solution was added 3 g. of dry pyridine. The solution was then heated under reflux on the steam bath, and, after 16 hours, a soft resinous cake had precipitated out. This was dissolved by the addition of a little water, and the resulting solution was poured into a large volume of an equal mixture of acetone and ether. The fibrous white polymer thus obtained was leached twice with fresh acetone-ether mixture, followed by two washings with ether alone, and dried to give 2.8 g. of quaternary derivative having a nitrogen content of 1.7% and a chlorine content of 3.0%. The chlorourethane which was quaternized was originally soluble in acetone and was quite hydrophobic, whereas the quaternized product was no longer soluble in acetone.

Example 10

The formation of the halourethane and its quaternization with a tertiary amine can be readily effected concomitantly. Thus, a mixture of 11.0 g. of polyvinyl alcohol, 10.5 g. of β-chloroethyl isocyanate and 100 ml. of dry pyridine was heated and stirred on the steam bath for 4 hours. On cooling, the solid quaternary derivative was collected and washed successively with ether, ethanol and ether. The product, weighing 20.5 g. was soluble in hot water and in 50% acetone.

Example 11

A mixture of 22.0 g. of polyvinyl alcohol, 10.5 g. of β-chloroethyl isocyanate and 100 ml. of dry pyridine was heated and stirred on the steam bath for 16 hours. The mixture was cooled, filtered and the product was washed repeatedly with ether. The dry quaternary derivative weighed 38.5 g., was soluble in hot water and had N=7.0% and Cl=8.7%.

Example 12

A highly modified polymer was prepared by heating a mixture of 11.0 g. of polyvinyl alcohol, 26.2 g. of β-chloroethyl isocyanate and 150 ml. of pyridine for 1 hour on the steam bath. The resulting heavy dope was diluted with 150 ml. of pyridine, and the modified polymer was precipitated by pouring the solution in a thin stream into ether. After repeated ether washings, the product was dried to give 38 g. of highly modified quaternized polymer which was soluble in cold water and in dioxane or acetone containing a little water and which analyzed for N=9.8, Cl=20.5.

Example 13

A 26 g. batch of partially deacetylated polyvinyl acetate was allowed to swell overnight in 200 ml. of dry pyridine. The resulting mixture was then mixed with an additional 50 ml. of pyridine and 23 g. of β-chloroethyl isocyanate, and heated and stirred on the steam bath for 4.5 hours. The reaction mixture was then diluted with 100 ml. of pyridine, and 52 g. of product was isolated by precipitation in ether. The product analyzed for N=7.2% and Cl=13.7%.

Example 14

A mixture of 26.2 g. of cellulose acetate (40.5% acetyl) and 250 ml. of dry pyridine was heated on the steam bath for 1 hour. To the partial solution thus obtained was added 12.0 g. of β-chloroethyl isocyanate, and the resulting mixture was heated and stirred on the steam bath for 4.5 hours. The cloudy dope thus obtained was poured in a thin stream into ether, and the resulting lumpy product was broken up in fresh ether. The product, weighing 37 g., was washed further with ether and ground to a powder which was soluble in 50% acetone but insoluble in hot or cold water and which had a nitrogen content of 5.5% and a chlorine content of 9.3%.

The other well-known hydroxy polymers or mixtures thereof can be modified in similar fashion using any of the haloisocyanates or tertiary amines as described hereinabove. By varying the reactants and their relative proportions, modified polymers of desired characteristics can be obtained at will including hydrophobic products, products having varying hydrophilic characteristics and completely water-soluble modified polymers.

Although the invention has been described in considerable detail with particular reference to certain preferred embodiments thereof, it will be understood that variations and modifications can be effected within the spirit and scope of the invention as described hereinabove and as defined in the appended claims.

We claim:

1. The method which comprises reacting a hydroxyl-containing polymer from the group consisting of hydroxyl-containing ethyl cellulose, polyvinyl alcohol, partially acetylated cellulose acetate and partially deacetylated polyvinyl acetate with a monohaloalkyl isocyanate and thereby forming a monohaloalkyl urethane derivative of said polymer characterized by being convertible to a quaternary urethane by quaternization with a tertiary amine.

2. The process according to claim 1 wherein the monohaloalkyl isocyanate is β-chloroethyl isocyanate.

3. The process according to claim 1 wherein the monohaloalkyl urethane derivative is converted to a quaternary urethane by quaterization with a tertiary amine.

4. The process according to claim 3 wherein the tertiary amine is pyridine.

5. A modified polymer capable of being quaternized by reaction with a tertiary amine and comprising a polymer from the group consisting of hydroxyl-containing ethyl cellulose, polyvinyl alcohol, partially acetylated cellulose acetate, and partially deacetylated polyvinyl acetate, having at least a portion of the positions normally occupied by functional hydroxyl groups occupied by monohaloalkyl urethane groups.

6. A modified polyvinyl alcohol having β-chloroethyl urethane groups substituent in at least a portion of the positions normally occupied by hydroxyl groups.

7. A partially acetylated cellulose acetate having β-chloroethyl urethane groups substituent in at least a portion of the positions normally occupied by hydroxyl groups.

8. A quaternary tertiary amine derivative of the modified polymer of claim 5.

9. A quaternary pyridine derivative of the modified polymer of claim 5.

References Cited in the file of this patent

UNITED STATES PATENTS

| | | |
|---|---|---|
| 2,125,901 | Evans et al. | Aug. 9, 1938 |
| 2,131,362 | Baldwin et al. | Sept. 27, 1938 |
| 2,284,895 | Hanford | June 2, 1942 |
| 2,335,582 | Coffman | Nov. 30, 1943 |
| 2,428,843 | Georges et al. | Oct. 14, 1947 |
| 2,451,963 | Loder | Oct. 19, 1948 |
| 2,466,404 | Fowler et al. | Apr. 5, 1949 |

FOREIGN PATENTS

| | | |
|---|---|---|
| 809,233 | France | Feb. 26, 1937 |

OTHER REFERENCES

Wenker: Journal American Chem. Soc., vol. 58, p. 2608 (1936).

Newman: Journal American Chem. Soc., vol. 57, pp. 732-5 (1935).